United States Patent [19]

Sun et al.

[11] Patent Number: 5,309,070
[45] Date of Patent: May 3, 1994

[54] AC TFEL DEVICE HAVING BLUE LIGHT EMITTING THIOGALLATE PHOSPHOR

[76] Inventors: Sey-Shing Sun, 6667 SW. 153rd Ave., Beaverton, Oreg. 97007; Richard T. Tuenge, Rte. 2, Box 1018, Hillsboro, Oreg. 97123; James Kane, 32 Royal Oak Rd., Lawrenceville, N.J. 08648; Christopher N. King, 5345 SW. Thomas, Portland, Oreg. 97221; P. Niel Yocom, 307 Shadybrook La., Princeton, N.J. 08540

[21] Appl. No.: 668,201

[22] Filed: Mar. 12, 1991

[51] Int. Cl.⁵ .............................................. H01J 1/63
[52] U.S. Cl. .................................... 313/503; 313/468
[58] Field of Search .......... 313/467, 503, 506, 509, 313/512, 468; 252/301.45; 340/781; 315/169.3

[56] References Cited

U.S. PATENT DOCUMENTS

| | | | |
|---|---|---|---|
| 3,623,996 | 11/1971 | Amster | 252/301.45 |
| 3,639,254 | 2/1972 | Peters | 252/301.45 |
| 3,742,277 | 6/1973 | Peters | 313/467 |
| 4,482,841 | 11/1984 | Tiku et al. | 313/506 |
| 4,599,538 | 7/1986 | Hidler et al. | 313/512 |
| 4,897,319 | 1/1990 | Sun | 313/509 |
| 5,072,152 | 12/1991 | Tuenge et al. | 313/509 |

FOREIGN PATENT DOCUMENTS 56-57877  5/1981  Japan .
56-166284 12/1981 Japan .
62-226806 3/1988  Japan .

OTHER PUBLICATIONS

"Developments in Electroluminescent Panels", *Journal of Crystal Growth*, 59(1982) pp. 81-97 A. Vecht.

"Luminescence and Structural Properties of Thiogallate Phosphor $Ce^{+3}$ and $Eu^{+2}$-Activated Phosphors, Part 1", Peters and Baglio, *J. Electrochem. Soc.: Solid State Science and Technology*, Feb. 1972.

Japanese patent application, Takahashi et al., having laid open No. 72592/90. Laid open on Mar. 12, 1990.

*Primary Examiner*—Donald J. Yusko
*Assistant Examiner*—John E. Giust
*Attorney, Agent, or Firm*—Chernoff Vilhauer McClung & Stenzel

[57] ABSTRACT

An AC TFEL device includes a front electrode set deposited on a transparent substrate and a rear electrode set, the electrode sets enclosing a thin film laminate which includes a pair of insulating layers sandwiching an alkaline earth thiogallate thin film phosphor doped with a rare earth activator. The thiogallate phosphor layer is capable of producing blue light of sufficient intensity to create a full color TFEL panel.

16 Claims, 6 Drawing Sheets

AC TFEL DEVICE HAVING BLUE LIGHT EMITTING THIOGALLATE PHOSPHOR

In the design of thin film electroluminescent (TFEL) panels which are matrix addressed it has long been a desired object to produce a full color panel. Considerable progress has been made in the development of red and green TFEL phosphors for such multi-color electroluminescent displays. However, it has been difficult to produce a phosphor capable of emitting blue light of the required chromaticity and intensity, and yet remain chemically stable in the TFEL environment. Without an efficient blue phosphor it is not possible to achieve the proper color balance to produce a true white in a full color display.

Previously, alkaline earth sulfides have been proposed as blue emitters in a TFEL panel as shown in Barrow et. al. U.S. Pat. No. 4,751,427. The Barrow et. al. patent discloses the use of strontium sulfide (SrS) as a host material doped with cerium fluoride ($CeF_3$) acting as an emitter to provide a source of photons. The problem with SrS:Ce, however, is that it has a blue-green chromaticity ($x=0.20$, $y=0.36$) which means that it is necessary to use a blue filter in conjunction with this material to achieve a reasonable chromaticity (x and y both less than 0.2). When a filter is used, the luminance level is reduced to less than 15% of the original luminance. In addition, this luminance tends to diminish dramatically as a function of time. The SrS material is hygroscopic and chemically unstable which adds complexity to the panel fabrication. Other blue-emitting phosphors have been investigated, one example being zinc sulfide/thulium fluoride. This substance has excellent blue chromaticity, but the brightness is rather low: 1 fL when excited at 1000 cycles per second. It is unlikely that further improvement can be made in this phosphor because it has been found that thulium electroluminescent excitation in ZnS is by energy transfer from the host instead of by direct impact excitation. Excitation by energy transfer from the host is an inefficient process and explains the poor emission intensity observed in the ZnS:Tm phosphor.

Thiogallates have been used in the past in connection with DCEL powder devices as reported in Vecht, "Developments in Electroluminescent Panels", *Journal of Crystal Growth* 59 (1982) pp. 81-97. Thiogallates, however, are ternary compounds and have not heretofore been considered practical for AC TFEL use because of the difficulty in maintaining proper stoichiometry in the preparation of the phosphor film.

SUMMARY OF THE PRESENT INVENTION

According to the present invention, an AC TFEL panel includes sets of orthogonally disposed top and bottom electrode layers sandwiching an electroluminescent laminate which includes an electroluminescent phosphor layer sandwiched between at least a pair of insulators. The electroluminescent material is comprised of a group II metal thiogallate with a rare earth dopant.

The general chemical formula proposed is: $mgA_2S_4$:RE, where M is selected from the group comprising magnesium, calcium, strontium, barium or zinc, and the RE refers to a rare earth activator dopant. For blue emission in the TFEL device, cerium is the preferred activator dopant.

The preferred structure for a TFEL blue-emitting device includes a glass substrate which supports a transparent electrode layer made of indium tin oxide (ITO). The substrate is then coated with barium tantalate (BTO), an insulator film. An electroluminescent laminate comprising a layer of calcium or strontium or barium thiogallate doped with cerium sandwiched between two layers of zinc sulfide (ZnS) is placed atop the barium tantalate layer.

A sputtering technique is used to deposit the thiogallate phosphor layer to maintain proper stoichiometry in the films. This method is preferred because deviation from proper stoichiometry is known to cause degradation in phosphor efficiency. Also, for that same reason, the thiogallate is sputtered from a target which includes an excess (between 3% and 5%) of $GA_2S_3$ used in preparing the sputtering target.

The function of the ZnS layers is to provide protection during thermal annealing and to act as carrier injection layers. A second BTO layer is placed atop the upper ZnS layer after an annealing process, and an aluminum top (rear) electrode set completes the fabrication of the device.

It is a principal object of this invention to provide a stable, efficient blue-emitting phosphor for a TFEL device.

It is a further object of this invention to provide a blue emitting thin film phosphor which can be utilized in the manufacture of full color TFEL panels.

Yet a further object of this invention is to provide a thin film laminate structure which can yield the requisite amount of blue light necessary to produce a full color thin film EL device.

The foregoing and other objectives, features, and advantages of the invention will be more readily understood upon consideration of the following detailed description of the invention, taken in conjunction with the accompanying drawings.

DETAILED DESCRIPTION OF THE INVENTION:

A TFEL panel includes a glass substrate which supports a transparent indium tin oxide (ITO) electrode layer. Deposited on top of the ITO electrode layer is layer of barium tantalate (BTO) which has a thickness of around 3000 Å. A layer of ZnS which is between 600 Å and 1200 Å thick is deposited on top of the BTO layer. Next, a layer of strontium or calcium thiogallate doped with cerium is deposited atop the first ZnS layer. The thiogallate phosphor layer is formed by sputtering from a target which has been prepared from a compound having an excess of gallium sulfide material. The purpose of using an excess of such material to prepare the target is to ensure proper stoichiometry in the film by allowing for losses that occur first during deposition and later during the annealing process, and to improve crystal growth. The thiogallate layer is covered with a thicker ZnS layer of between 1000Å to 2000Å thick. A second BTO insulator layer 3000Å thick is placed atop the second ZnS layer. The top rear electrode layer is formed of electrodes made of aluminum.

The group II metal thiogallates are low EL efficiency phosphors. Thus, a high dielectric insulator such as 3000 Å of BTO is used to increase charge injection and to allow the use of a thicker phosphor layer without excessive increase in the operating voltage. In addition, the insulator material must be able to withstand high temperature annealing during device fabrication. During the annealing process the thiogallate phosphor layer has a tendency to turn rough due to grain growth. To fully cover the phosphor layer, the BTO layer must be thicker than 2500 Å to avoid breakdown at thin spots. In addition to BTO, other high dielectric materials such as strontium titanate/zirconate mixture and aluminate/titanate mixture can be used to achieve the same result.

The ZnS buffer layers are of special importance. The second (top) ZnS layer protects the thiogallate phosphor from oxidation during annealing. The ideal thickness of this layer ranges from around 1000 Å to 2000 Å. If the layer is too thick there will be an excessive rise in the threshold voltage, but if too thin, there will be insufficient protection for the thiogallate phosphor layer. The ideal thickness for the bottom ZnS layer is 600Å to 1200Å. If this layer is too thick, the threshold voltage rises; if too thin, film delamination can occur after annealing.

In addition to protecting the thiogallate film, the ZnS layers act as carrier injection layers. During device operation, a conduction charge formed at breakdown becomes a new source of electrons for Ce ion excitation in addition to the existing sources at the ZnS/thiogallate interfaces. This serves to increase the luminance efficiency of the device.

Figure 1:
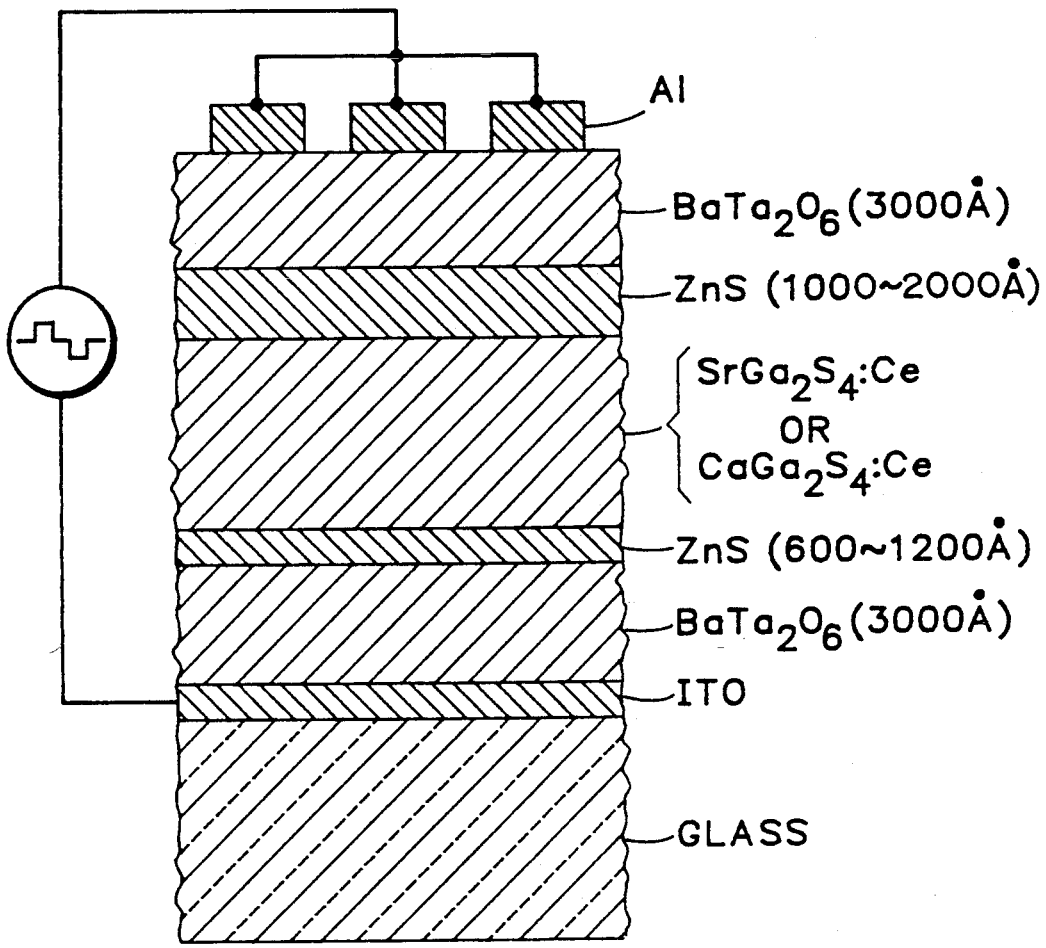
FIG. 1 is a partial side cut-a way view of a TFEL device employing the thiogallate phosphor of the present invention.
Figure 2:
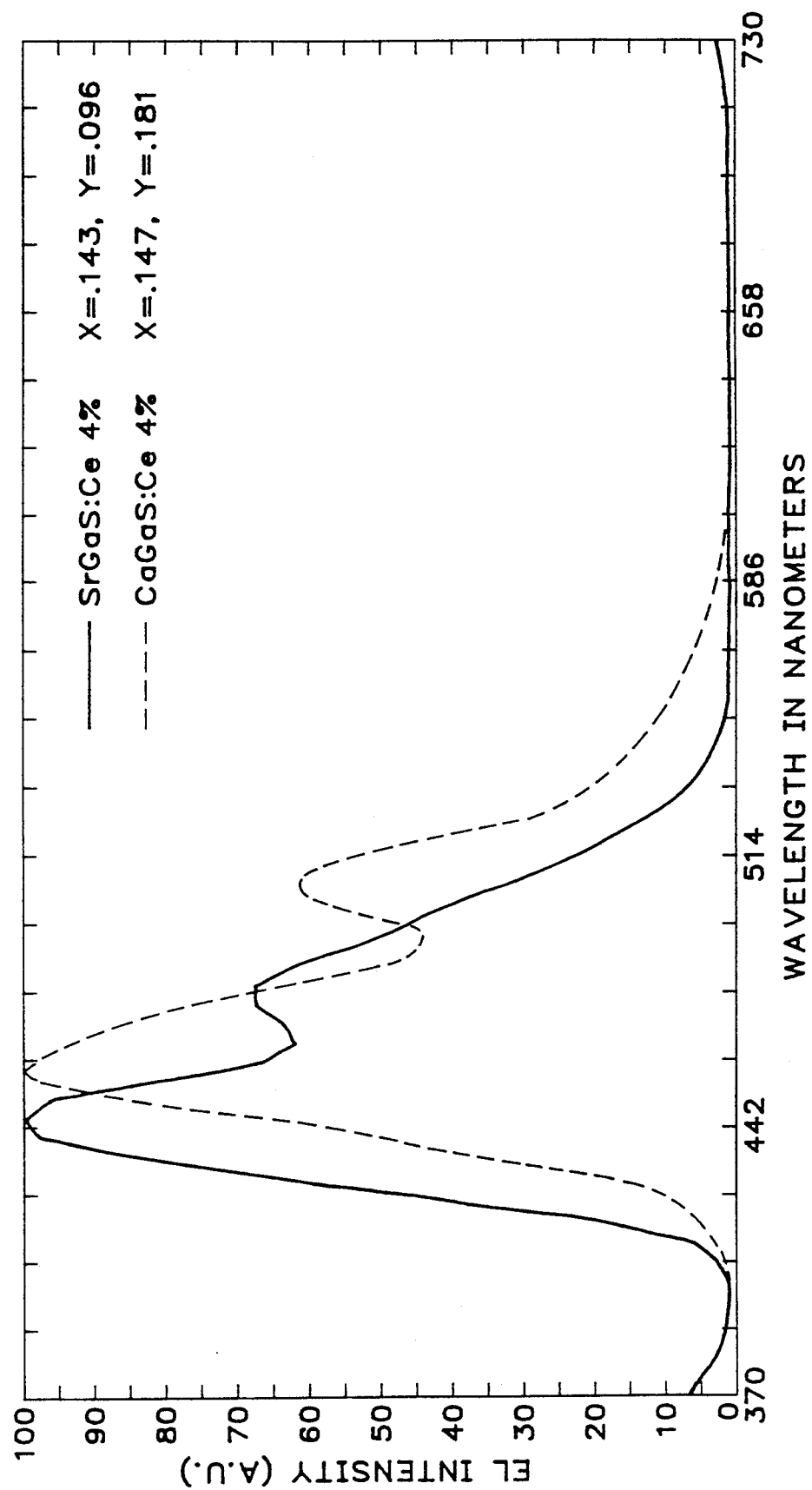
FIG. 2 is a graph illustrating the intensity versus wave length characteristics of two thiogallate phosphors which may be used in accordance with the present invention.
Figure 3:
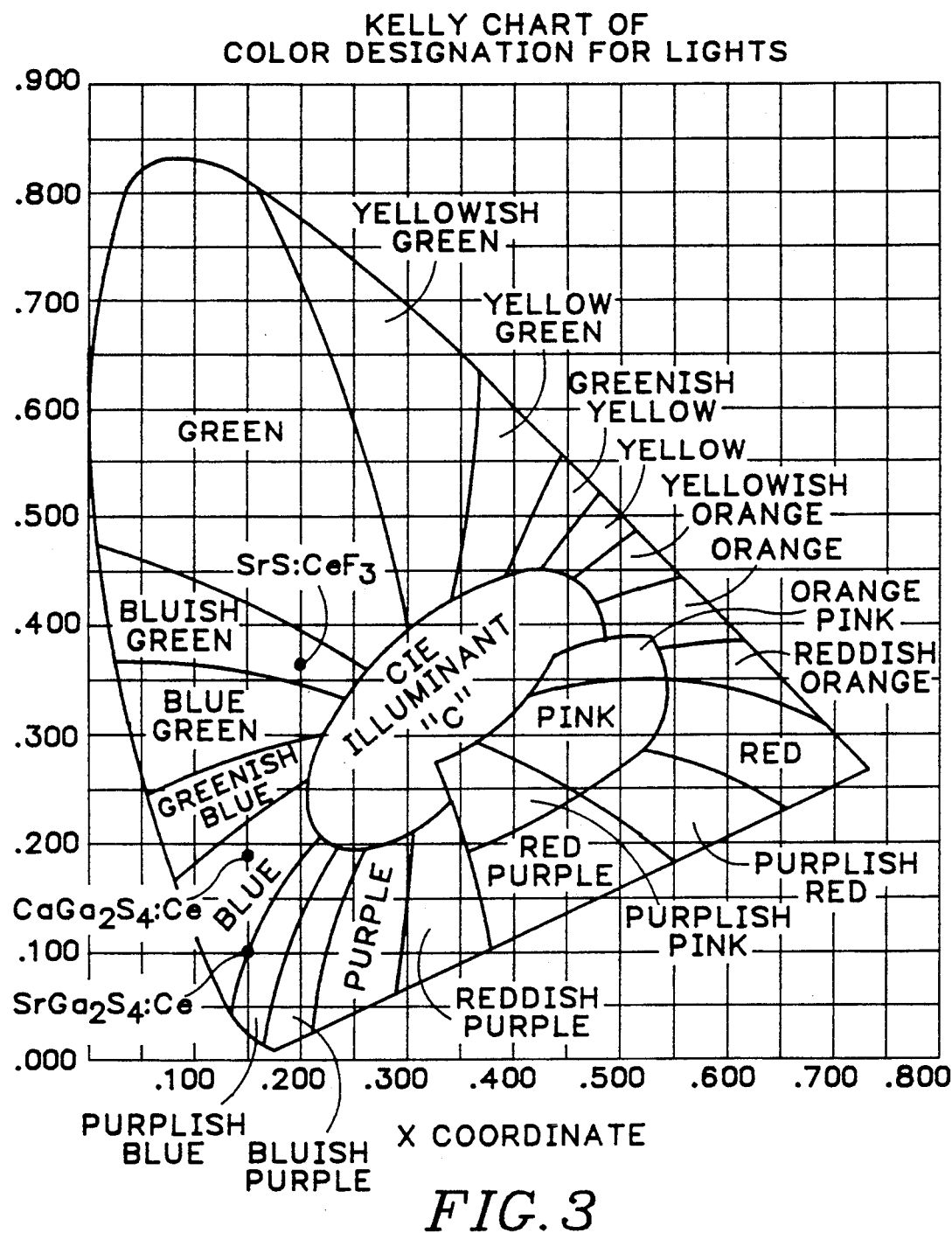
FIG. 3 is a graph comprising a Kelly chart illustrating the chromaticity of the thiogallate phosphors used in the TFEL panel of FIG. 1.

The electroluminescence spectra of the strontium thiogallate and calcium thiogallate TFEL devices are shown in FIG. 2. The double peaks that are observed for the cerium doped thiogallates is due to the fact that the 4f ground state is a doublet ($2f_j$ with $j=5/2$ and $j=7/2$). The emission wave lengths of the cerium peaks in strontium thiogallate are 440nm and 480nm which are all blue in color. The chromaticity of the strontium thiogallate doped with cerium is therefore very saturated (CIE coordinates, $x=0.15$, $y=0.10$). By contrast, the emission wave length of peaks in the calcium thiogallate are shifted by about 20nm to the longer wave length due to a different crystal field in the calcium thiogallate host. Although the emission color of calcium thiogallate doped with cerium is not as deep a blue as the strontium thiogallate, its CIE coordinates, $x=0.15$, $y=0.10$, are still within the pure blue region of the chromaticity diagram illustrated in FIG. 3. Since the human eye has a greater sensitivity to the higher emission wave length of calcium thiogallate, the same number of photons will produce more luminance in this region. Thus, the luminous efficiency of calcium thiogallate is twice that of strontium thiogallate.

In general, the emission wave lengths of the cerium peaks in strontium thiogallate and in calcium thiogallate are rather stable. They do not vary with the dopant concentration or process conditions. This is to be contrasted with strontium sulfide doped with cerium where the wave length of the cerium peaks varies greatly with the doping concentration and process conditions.

Figure 4:
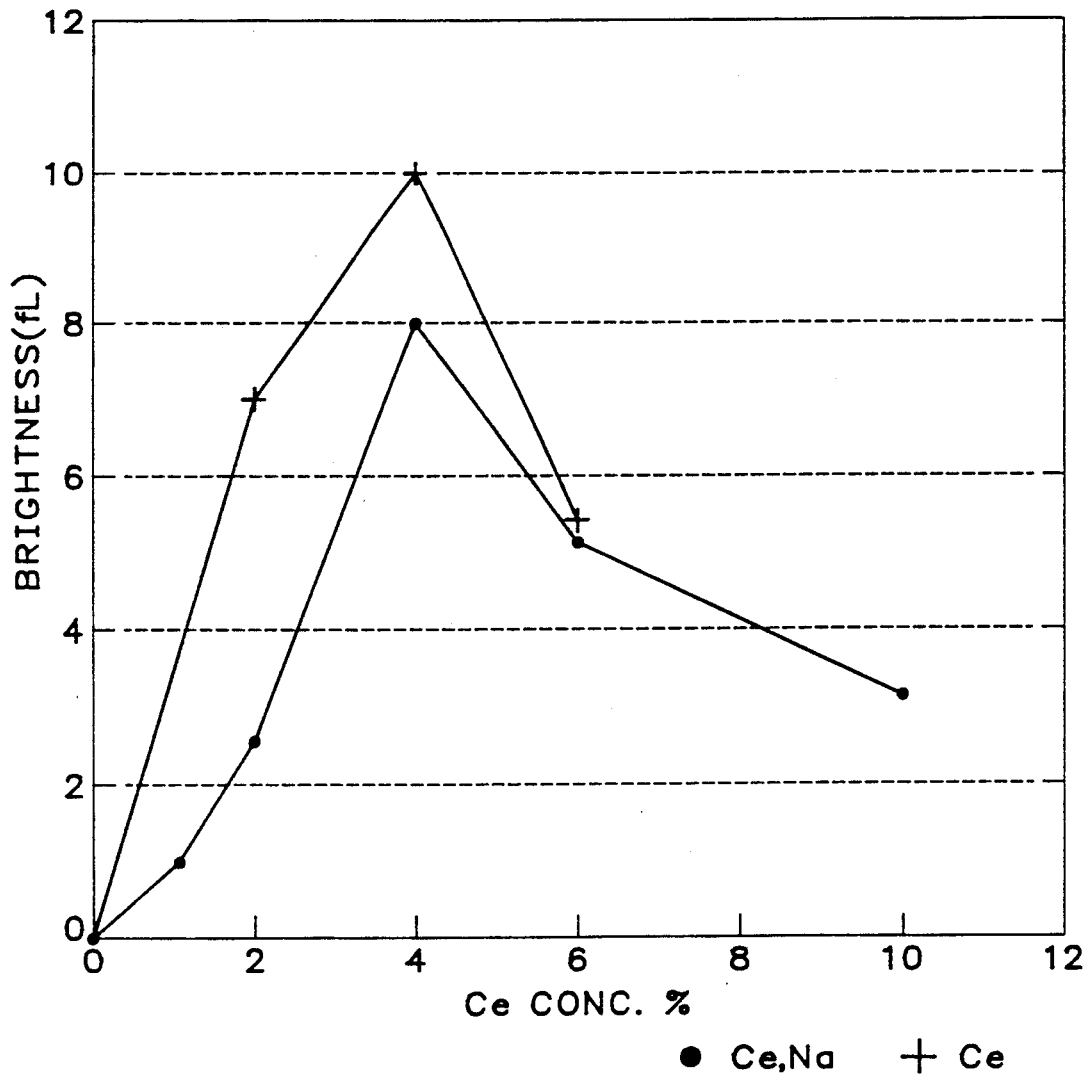
FIG. 4 is a chart illustrating the effect on luminance of the relative concentration of cerium as a dopant for strontium thiogallate.

The effect upon luminance of the Ce concentration is shown in FIG. 4. The brightness of strontium thiogallate is highly dependent upon the cerium concentration. Acceptable results are obtainable for concentrations of cerium ranging from 2% to 6%, however, there is a substantial peak that occurs at 4%.

Figure 5:
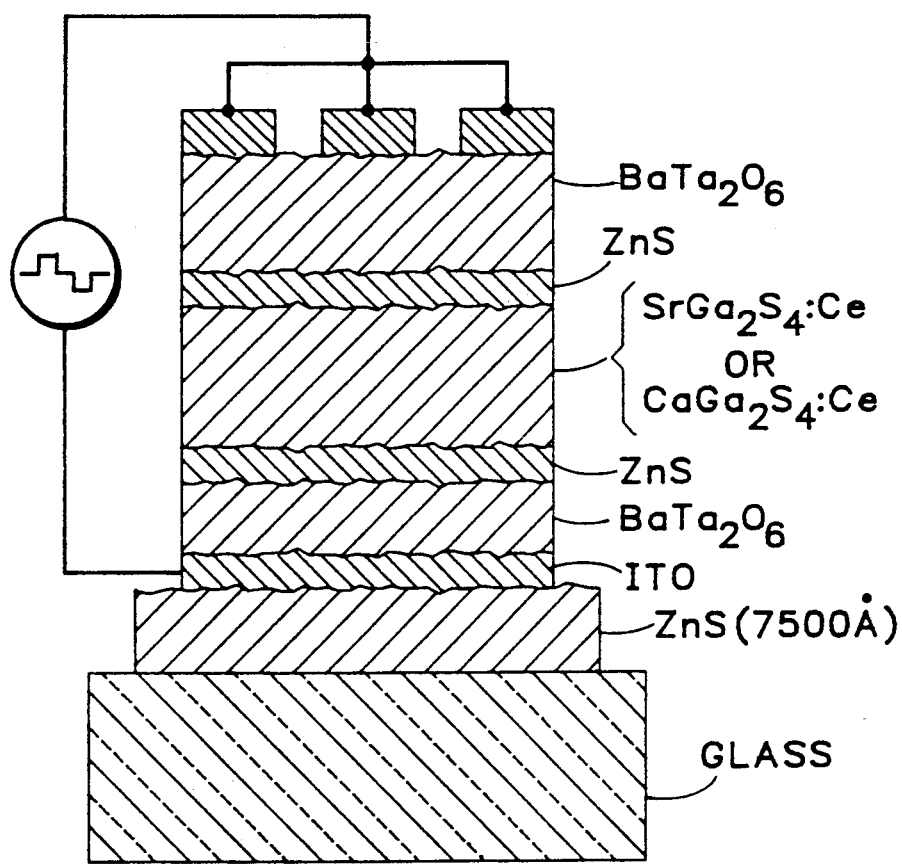
FIG. 5 is a partial side cut-a-way view of a second embodiment of the TFEL device of the present invention.

An improved structure is shown in FIG. 5. It is known that the films deposited by a sputtering technique tend to have a fine grain structure and hence a smooth surface. In such cases a large amount of the light generated inside the thiogallate film can be lost due to internal reflection. To remedy this effect a light out-coupling layer can be used to enhance the light emission from the front surface. The light out-coupling layer, described in more detail in copending U.S. patent application Ser. No. 07/474,949, comprises a thick layer (about 7500 Å) of ZnS deposited on the glass substrate. At this thickness the ZnS layer will normally have a roughened surface, and the entire remaining film stack will conform to the roughened surface as it is deposited over the thick ZnS layer. This structure provides an improvement of as much as 50% in the luminance of thiogallate blue TFEL devices. For example, such a structure produces 25 fL at 1000 Hz for calcium thiogallate devices.

Figure 6:
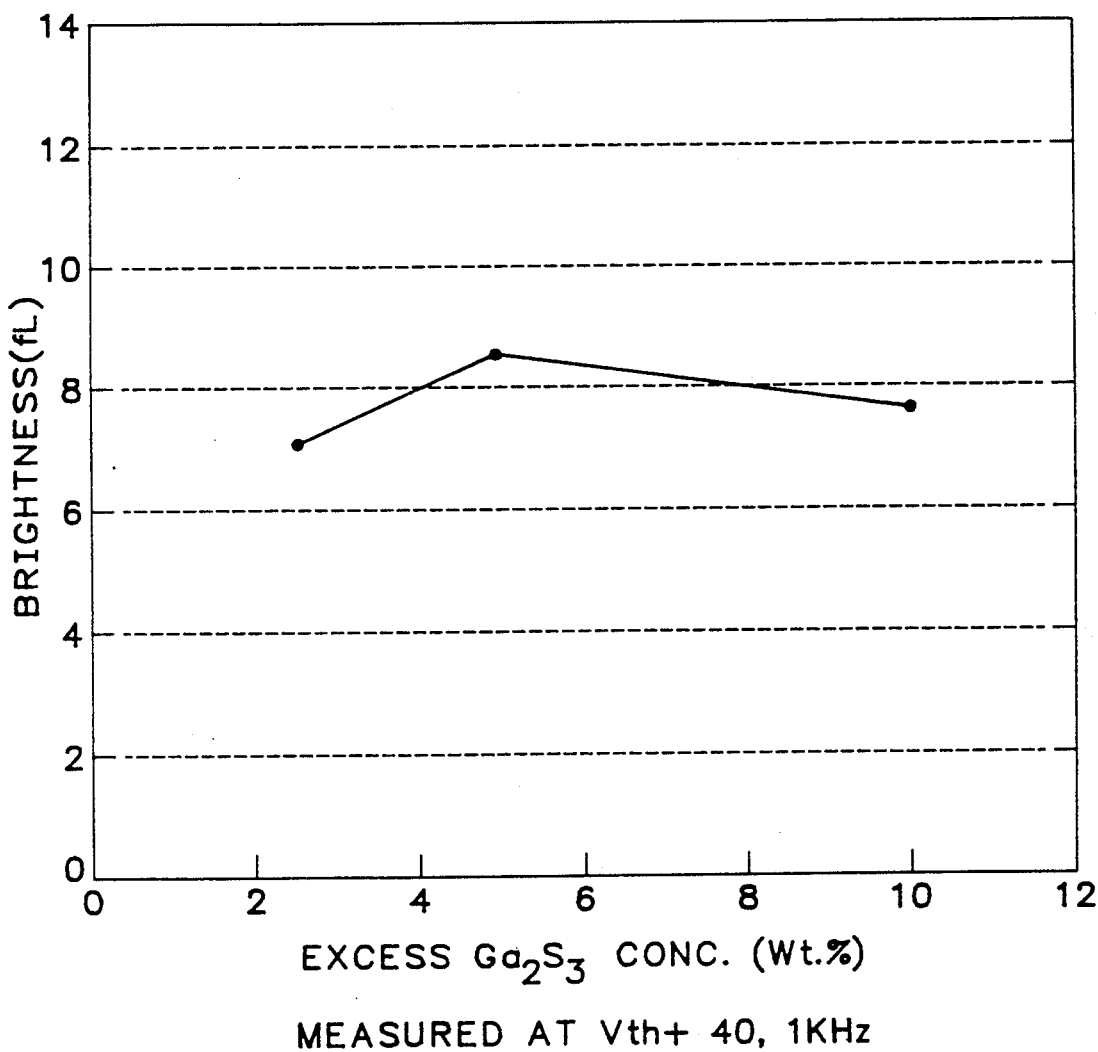
FIG. 6 is a graph showing the effect of excess thiogallate concentration on the luminance of strontium thiogallate doped with cerium.

A factor which is important to the stoichiometry of the thiogallate films is illustrated in FIG. 6. When an excess of 5% of gallium sulfide is used to prepare the sputtering target, brightness exceeds 8 fL, whereas an excess of only 2% is nearly 20% dimmer. The sputtering target is prepared in the conventional manner as is well known in the art. A powder is prepared which is pressed and sintered, and the target thus formed is used to sputter the film onto the substrate. The precise reason for the improved performance with an excess of gallium sulfide is unknown. However, it is possible that a type of charge compensation exists or that the excess gallium sulfide provides a safety factor that compensates for possible losses of material during the target preparation process resulting in the correct proportions of the thiogallate compound. While for strontium thiogallate the best performance is achieved from targets having a 5% by weight excess gallium sulfide, for calcium thiogallate, the optimum excess in gallium sulfide is around 3% by weight. However, for either, a higher excess gallium sulfide concentration leads to phase segregation after annealing and poor performance of the panel generally.

Referring again to FIG. 4, FIG. 4 illustrates the effect of the absence of a coactivator dopant on the performance of a strontium thiogallate panel. Previously it was believed that coactivator dopants such as sodium were necessary in cerium doped phosphors as used in DC EL powder devices. As the graph shows, however, the absence of sodium results in a 20% increase in luminance at a concentration of 4% for the cerium dopant.

In addition to a blue emission AC TFEL device, a green emission can be produced by substituting Eu dopants for Ce dopants. A device fabricated from $SrGa_2S_4$:Eu delivers a luminance of 8 fL at 60 Hz and its chromaticity is x=0.25, y=0.67 which is better than those of existing ZnS:Tb green TFEL devices.

The terms and expressions which have been employed in the foregoing abstract and specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. An AC TFEL device comprising a front electrode set deposited on a transparent substrate, a rear electrode set, and a thin film laminate sandwiched between said front and rear electrode sets, said thin film laminate including at least a pair of insulating layers sandwiching a thiogallate phosphor layer having the chemical formula:

$MGa_2S_4$:RE, where M is taken from the group calcium, strontium, zinc or barium, and RE comprises a rare earth activator dopant.

2. The AC TFEL device of claim 1 where M is strontium.

3. The AC TFEL device of claim 1 where M is calcium.

4. The AC TFEL device of claim 1 where M is barium.

5. The AC TFEL device of claim 1 where M is zinc.

6. The AC TFEL device of claim 1, 2, 3, 4 or 5 where RE is cerium.

7. The AC TFEL device of claim 1, 2, 3, 4 or 5 where RE is europium.

8. The AC TFEL device of claim 1 where the thiogallate phosphor layer is formed by sputtering from a target material prepared with an excess of gallium sulfide.

9. The AC TFEL device of claim 8 where the excess of gallium sulfide is in a range of between 2% to 5% by weight 10. The AC TFEL device of claim 1, further including a pair of protective film layers sandwiching the thiogallate phosphor layer and interposed between the pair of insulating layers.

11. The AC TFEL device of claim 10 wherein the insulating layers have a high dielectric constant and the thiogallate phosphor layer is relatively thick whereby to provide increased luminance without appreciably raising the threshold voltage of the device.

12. The AC TFEL device of claim 11 wherein said protective layers are fabricated from a material for providing enhanced carrier injection in the thiogallate phosphor layer.

13. The AC TFEL device of claim 1 further including a light out-coupling layer deposited atop the transparent electrode layer having a roughened surface for alleviating internal reflections.

14. The AC TFEL device of claim 6 wherein the concentration of the cerium dopant lies in a range of 2% to 6%.

15. An AC TFEL device comprising a front electrode set deposited on a transparent substrate, a rear electrode set, and a thin film laminate sandwiched between said front and rear electrode sets, said thin film laminate including at least a pair of insulating layers sandwiching a strontium thiogallate phosphor layer doped with cerium.

16. An AC TFEL device comprising a front electrode set deposited on a transparent substrate, a rear electrode set, and a thin film laminate sandwiched between said front and rear electrode sets, said thin film laminate including at least a pair of insulating layers sandwiching a calcium thiogallate phosphor layer doped with cerium.

* * * * *

UNITED STATES PATENT AND TRADEMARK OFFICE
CERTIFICATE OF CORRECTION

PATENT NO. : 5,309,070
DATED : May 3, 1994
INVENTOR(S) : Sey-Shing Sun, et al.

It is certified that error appears in the above-identified patent and that said Letters Patent is hereby corrected as shown below:

Column 1, line 64, delete "$mgA_2S_4$" and insert --$MGa_2S_4$--.

Column 2, line 16, delete "$GA_2S_3$" and insert --$Ga_2S_3$--;

Column 2, line 40, delete "cut-a way" and insert --cut-a-way--;

Signed and Sealed this

Eighteenth Day of July, 1995

Attest:

BRUCE LEHMAN

*Attesting Officer*     *Commissioner of Patents and Trademarks*